US010746957B2

(12) United States Patent
Osaka et al.

(10) Patent No.: US 10,746,957 B2
(45) Date of Patent: Aug. 18, 2020

(54) LENS DRIVING DEVICE, CAMERA MODULE, AND CAMERA-EQUIPPED DEVICE

(71) Applicants: Tomohiko Osaka, Tokyo (JP); Norikazu Kudo, Tokyo (JP)

(72) Inventors: Tomohiko Osaka, Tokyo (JP); Norikazu Kudo, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 125 days.

(21) Appl. No.: 16/091,559

(22) PCT Filed: Apr. 5, 2016

(86) PCT No.: PCT/JP2016/001913
§ 371 (c)(1),
(2) Date: Oct. 5, 2018

(87) PCT Pub. No.: WO2017/175254
PCT Pub. Date: Oct. 12, 2017

(65) Prior Publication Data
US 2019/0107684 A1    Apr. 11, 2019

(51) Int. Cl.
*G02B 7/09* (2006.01)
*H04N 5/225* (2006.01)
(Continued)

(52) U.S. Cl.
CPC ............. *G02B 7/09* (2013.01); *G02B 7/04* (2013.01); *G03B 13/36* (2013.01); *H01F 7/066* (2013.01);
(Continued)

(58) Field of Classification Search
CPC .. G02B 7/09; G02B 7/04; G03B 13/36; H01F 7/066; H01F 7/081; H01F 2007/086; H04N 5/225
(Continued)

(56) References Cited

U.S. PATENT DOCUMENTS

2014/0340574 A1    11/2014   Han
2015/0277081 A1    10/2015   Hagiwara
(Continued)

FOREIGN PATENT DOCUMENTS

JP    2009288769 A    12/2009
JP    2011-028180 A    2/2011
(Continued)

OTHER PUBLICATIONS

Extended European Search Report for 16897813.8 dated Nov. 14, 2019, 8 pages.
(Continued)

*Primary Examiner* — Collin X Beatty
(74) *Attorney, Agent, or Firm* — Brundidge & Stanger, P.C.

(57) ABSTRACT

A lens driving device according to the present invention is a lens driving device that includes an auto-focus coil and an auto-focus magnet and that moves a movable auto-focus unit including the auto-focus coil in the direction of an optical axis relative to a fixed auto-focus unit including the auto-focus magnet by using a driving force of a voice coil motor constituted of the auto-focus coil and the auto-focus magnet. The fixed auto-focus unit includes a case formed of a non-magnetic material and having a rectangular shape in plan view and a base on which the case is fixed. The auto-focus magnet has the shape of a flat plate disposed on a side face of the case, and at least one of the four side faces
(Continued)

of the case is a non-magnet-disposed face, on which the auto-focus magnet is not disposed.

14 Claims, 8 Drawing Sheets

(51) Int. Cl.
*G02B 7/04* (2006.01)
*G03B 13/36* (2006.01)
*H01F 7/06* (2006.01)
*H01F 7/08* (2006.01)
*H01F 7/17* (2006.01)

(52) U.S. Cl.
CPC ............... *H01F 7/081* (2013.01); *H01F 7/17* (2013.01); *H04N 5/225* (2013.01); *H01F 2007/086* (2013.01)

(58) Field of Classification Search
USPC ........................................................ 359/824
See application file for complete search history.

(56) References Cited

U.S. PATENT DOCUMENTS

| | | | |
|---|---|---|---|
| 2015/0316754 A1 | 11/2015 | Sanjo | |
| 2016/0255276 A1 | 9/2016 | Sekimoto | |
| 2017/0353634 A1* | 12/2017 | Kim | ................ G02B 5/005 |
| 2018/0100984 A1* | 4/2018 | Wu | ................ G02B 27/646 |

FOREIGN PATENT DOCUMENTS

| | | | |
|---|---|---|---|
| JP | 2011-203476 A | 10/2011 | |
| JP | 2013083827 A | 5/2013 | |
| JP | 2015-194656 A | 11/2015 | |
| JP | 2016-004253 A | 1/2016 | |
| KR | 101406016 B1 | 6/2014 | |
| KR | 101431182 B1 | 8/2014 | |
| KR | 1020150113675 A | 10/2015 | |
| WO | 2015/052982 A1 | 4/2015 | |

OTHER PUBLICATIONS

International Search Report from International Application No. PCT/JP2016/001913 dated Jul. 5, 2016.

* cited by examiner

FIG. 10B

LENS DRIVING DEVICE, CAMERA MODULE, AND CAMERA-EQUIPPED DEVICE

TECHNICAL FIELD

The present invention relates to an auto-focusing lens driving apparatus, and to a camera module and a camera-mounted apparatus that have an autofocus function.

BACKGROUND ART

In general, a small-sized camera module is mounted in mobile terminals, such as smartphones. A lens driving apparatus having an autofocus function of automatically performing focusing during capturing a subject (hereinafter referred to as "AF function". AF: Auto Focus) is applied in such a camera module (see, for example, Patent Literatures (hereinafter, abbreviated as PTLS) 1 and 2).

The auto-focusing lens driving apparatus includes, for example, an auto-focusing coil (hereinafter referred to as "AF coil") disposed at the periphery of the lens part, an auto-focusing magnet (hereinafter referred to as "AF magnet") disposed to be radially spaced apart from the AF coil, and an elastic supporting part (e.g., plate spring) for elastically supporting an autofocus movable part (hereinafter referred to as "AF movable part") including the lens part and the AF coil, for example, with respect to an autofocus fixing part (hereinafter referred to as "AF fixing part") including the AF magnet. Focusing is automatically carried out by moving the AF movable part with respect to the AF fixing part in the optical-axis direction by utilizing a driving force of a voice coil motor composed of the AF coil and the AF magnet. Note that, the AF fixing part may include the AF coil and the AF movable part may include the AF magnet.

In lens driving apparatuses disclosed in PTLS 1 and 2, a case which serves as a casing of the lens driving apparatus is formed of a magnetic material, and an AF magnet is disposed on the inner surface of the case. Since the case functions as a yoke which forms a magnetic circuit with the AF magnet, leakage flux from the AF magnet is reduced. This increases magnetic lines of force which cross the AF coil, so that the driving efficiency of the voice coil motor improves.

CITATION LIST

Patent Literature

PTL 1
Japanese Patent Application Laid-Open No. 2016-004253
PTL 2
Japanese Patent Application Laid-Open No. 2015-194656

SUMMARY OF INVENTION

Technical Problem

In recent years, a camera module having a plurality of (typically two) lens driving apparatuses is put into practical use (so-called dual camera). A dual camera has various possibilities depending on the use scenes, such as two images having different focal lengths can be simultaneously captured, a still image and a moving image can be simultaneously captured, and the like.

As disclosed in PTLS 1 and 2, in the case where the lens driving apparatus with the yoke covering the periphery thereof is applied to a dual camera, two lens driving apparatuses are disposed adjacent to each other. This, however, may cause magnetic interference to hinder their operations. For example, when one of the lens driving apparatuses has a moving-magnet system image stabilization function, an image stabilization movable part having an image stabilization magnet is drawn to the yoke of the other lens driving apparatus, so that the position of the lens is deviated within a plane orthogonal to the optical axis. Therefore, both of the apparatuses need to be spaced apart at a certain distance from each other, which impairs miniaturization thereof, resulting in disadvantageous for commercialization.

An object of the present invention is to provide a lens driving apparatus, a camera module, and a camera-mounted apparatus which are suitable for use as a dual camera while making it possible to suppress magnetic interference with an adjacent lens driving apparatus.

Solution to Problem

A lens driving apparatus reflecting an aspect of the present invention includes:
an auto-focusing coil to be disposed at a periphery of a lens holder; and
an auto-focusing magnet to be disposed to be radially spaced apart from the auto-focusing coil, the lens driving apparatus being configured to move, with respect to an autofocus fixing part including the auto-focusing magnet, an autofocus movable part including the auto-focusing coil in an optical-axis direction by utilizing a driving force of a voice coil motor composed of the auto-focusing coil and the auto-focusing magnet,
in which the autofocus fixing part comprises a case having a quadrangular shape in plan view made of a non-magnetic material; and a base to which the case is fixed,
in which the auto-focusing magnet has a flat plate shape disposed to side surfaces of the case, and
in which at least one of four side surfaces of the case is a magnet non-arranged surface to which the auto-focusing magnet is not disposed.

A camera module reflecting an aspect of the present invention includes:
the lens driving apparatus described above;
a lens part to be mounted in the lens driving apparatus; and
an image capturing part configured to capture a subject image imaged by the lens part.

A camera-mounted apparatus reflecting an aspect of the invention is an information device or a transporting device, and
includes the camera module described above.

Advantageous Effects of Invention

According to the present invention, a lens driving apparatus, a camera module, and a camera-mounted apparatus which are suitable for use as a dual camera while making it possible to suppress magnetic interference with an adjacent lens driving apparatus.

DESCRIPTION OF EMBODIMENTS

Hereinafter, an embodiment of the present invention will be described in detail with reference to the drawings.

Figure 1A:
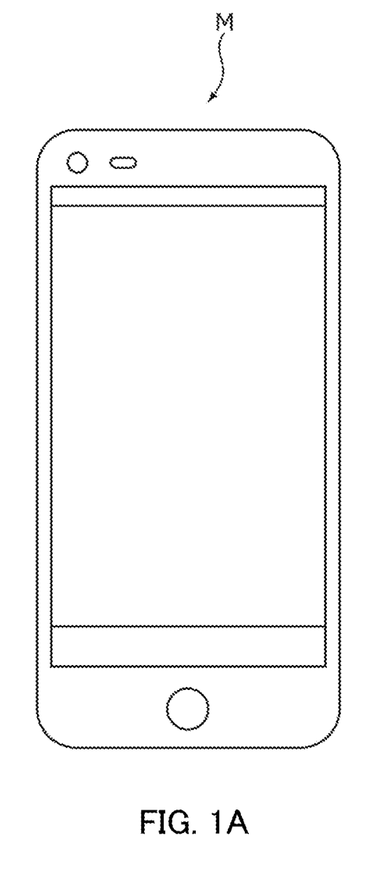
FIGS. 1A and 1B illustrate a smartphone in which a camera module according to an embodiment of the present invention is mounted.
Figure 1B:
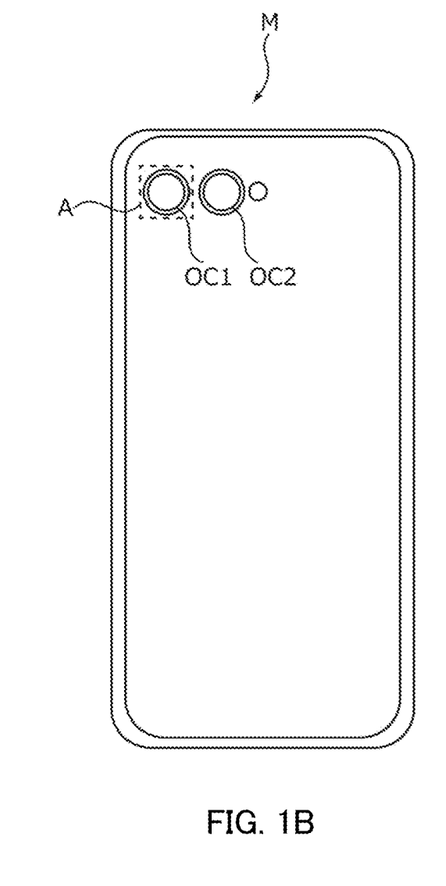

FIGS. 1A and 1B illustrate smartphone M (camera-mounted apparatus) in which camera module A according to an embodiment of the present invention is mounted. Smartphone M has a dual camera consisting of two back cameras OC1 and OC2. Camera module A is applied to one back camera OC1. Camera module A has an autofocus function, and automatically performs focusing during capturing of a subject. The other back camera OC2 is composed of a camera module having a voice coil motor in the same manner as back camera OC1, and has at least either of the autofocus function and the image stabilization function.

Figure 2:
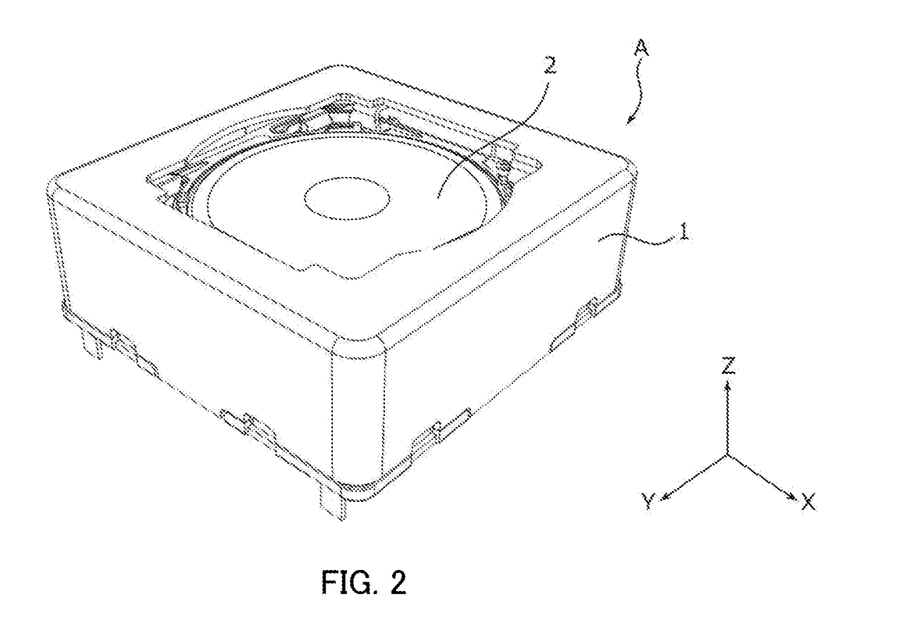
FIG. 2 is a perspective view of an external appearance of the camera module.

FIG. 2 is a perspective view of an external appearance of camera module A. As illustrated in FIG. 2, descriptions will be given for the embodiment with an orthogonal coordinate system (X, Y, Z). The same orthogonal coordinate system (X, Y, Z) is also used for illustration of below-mentioned figures. Lens driving apparatus 1 is mounted such that the front-rear direction is the Z-direction during actually capturing of an image with smartphone M. That is, the Z-direction is the optical-axis direction, the upper side in the figures is the light reception side in the optical-axis direction (also referred to as "macro position side"), and the lower side is the image formation side in the optical-axis direction (also referred to as "infinity position side"). In addition, the X- and Y-directions orthogonal to the Z-axis are referred to as "optical-axis-orthogonal directions."

Camera module A includes: lens part 2 including a cylindrical lens barrel and a lens housed therein; AF lens driving apparatus 1; an image capturing part (not illustrated) configured to capture a subject image imaged by lens part 2, and the like.

The image capturing part (not illustrated) includes an imaging device (not illustrated) and an image-sensor board (not illustrated) to which the imaging device is mounted, and the image capturing part is disposed on the image formation side in the optical-axis direction of lens driving apparatus 1. The imaging device (not illustrated) is composed of, for example, a charge-coupled device (CCD) image sensor, a complementary metal oxide semiconductor (CMOS) image sensor, or the like. The imaging device (not illustrated) captures a subject image imaged by lens part 2, converts optical signals into electrical signals, and outputs converted signals to an image processing section (not illustrated).

Figure 3:
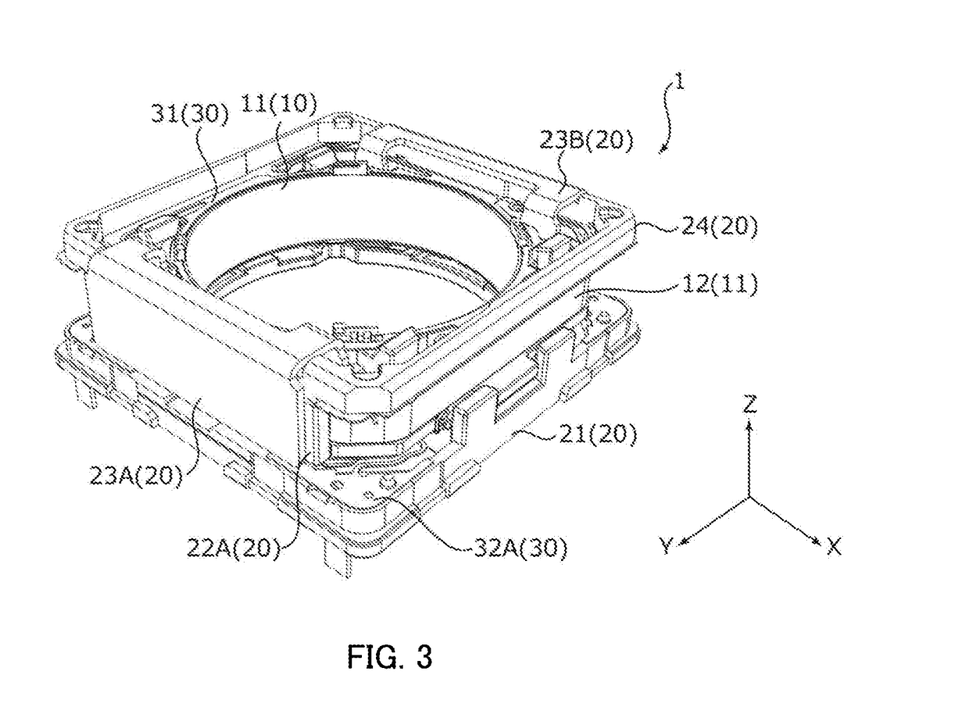
FIG. 3 is a perspective view illustrating a state where a case is removed from a lens driving apparatus.
Figure 4:
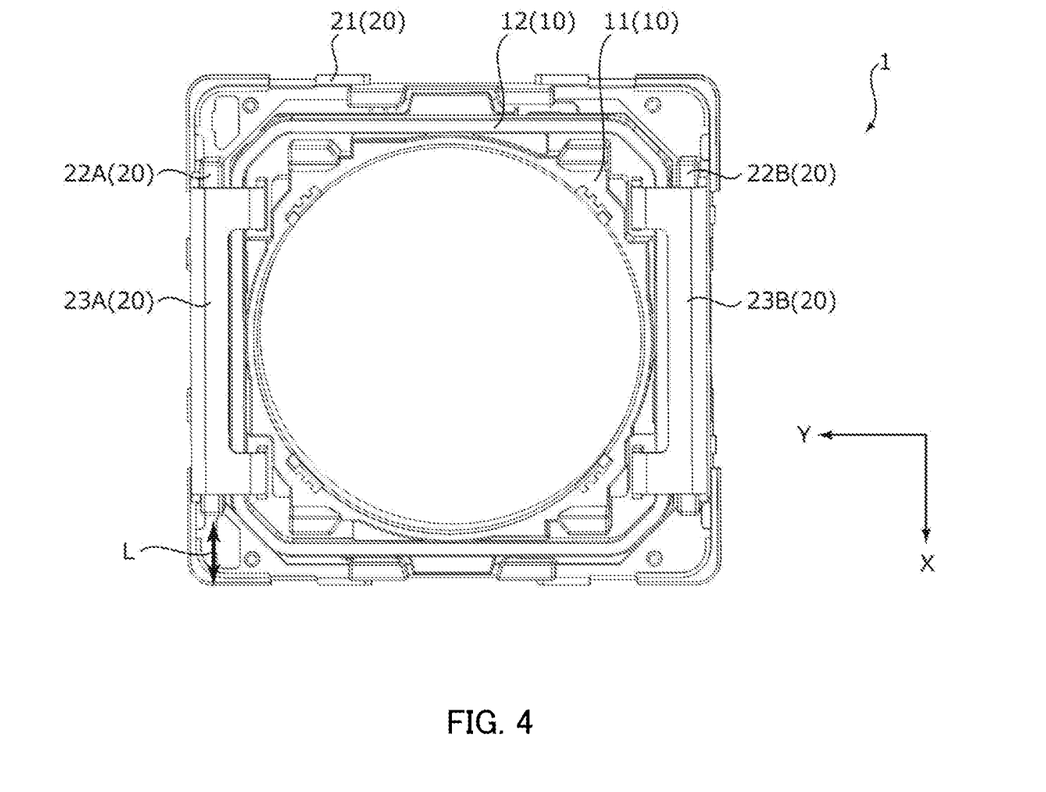
FIG. 4 is a plan view illustrating a state where a case, a spacer, and an upper elastic supporting member are removed from the lens driving apparatus.
Figure 5:
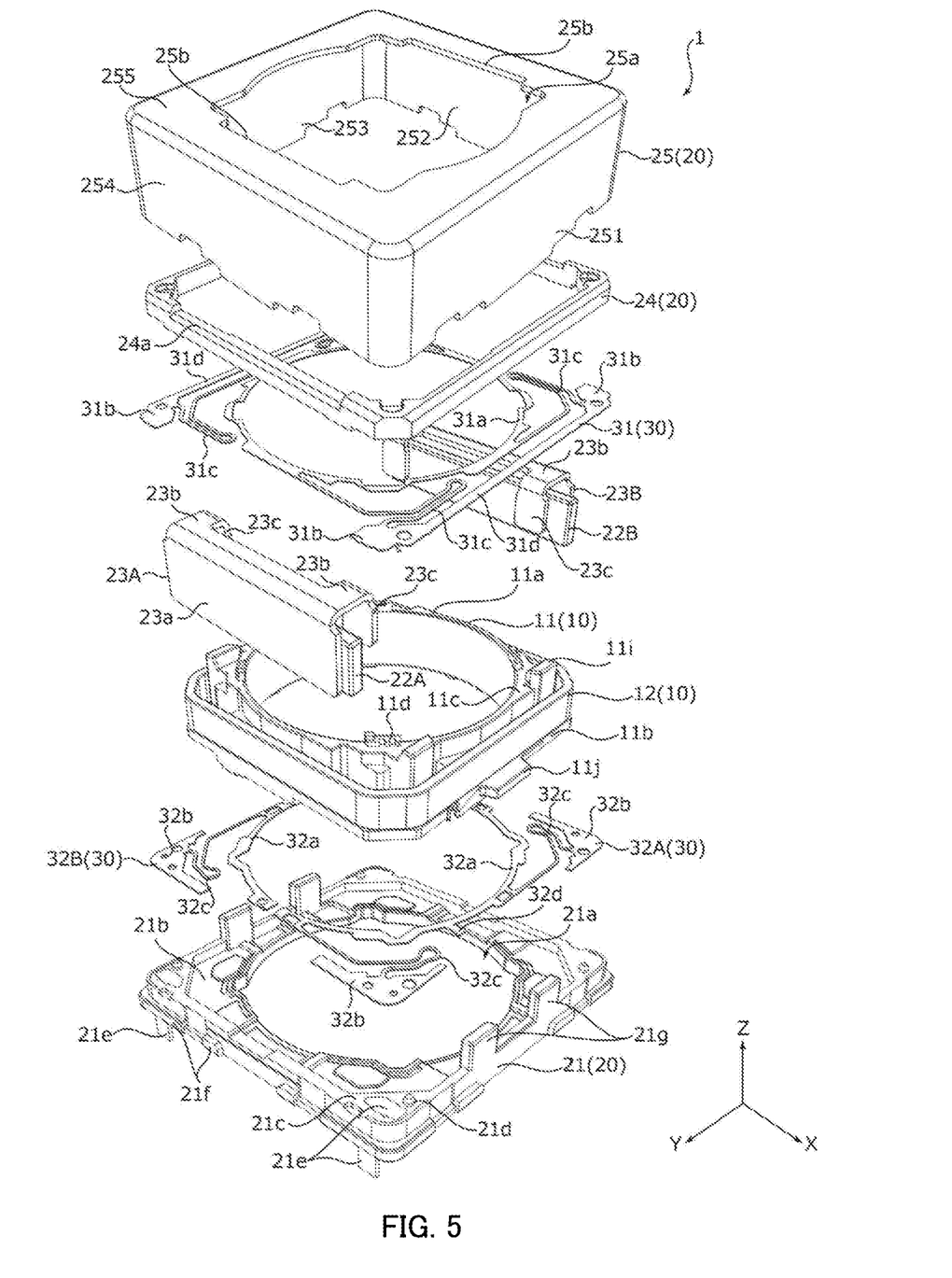
FIG. 5 is an exploded perspective view of the lens driving apparatus as seen from above.
Figure 6:
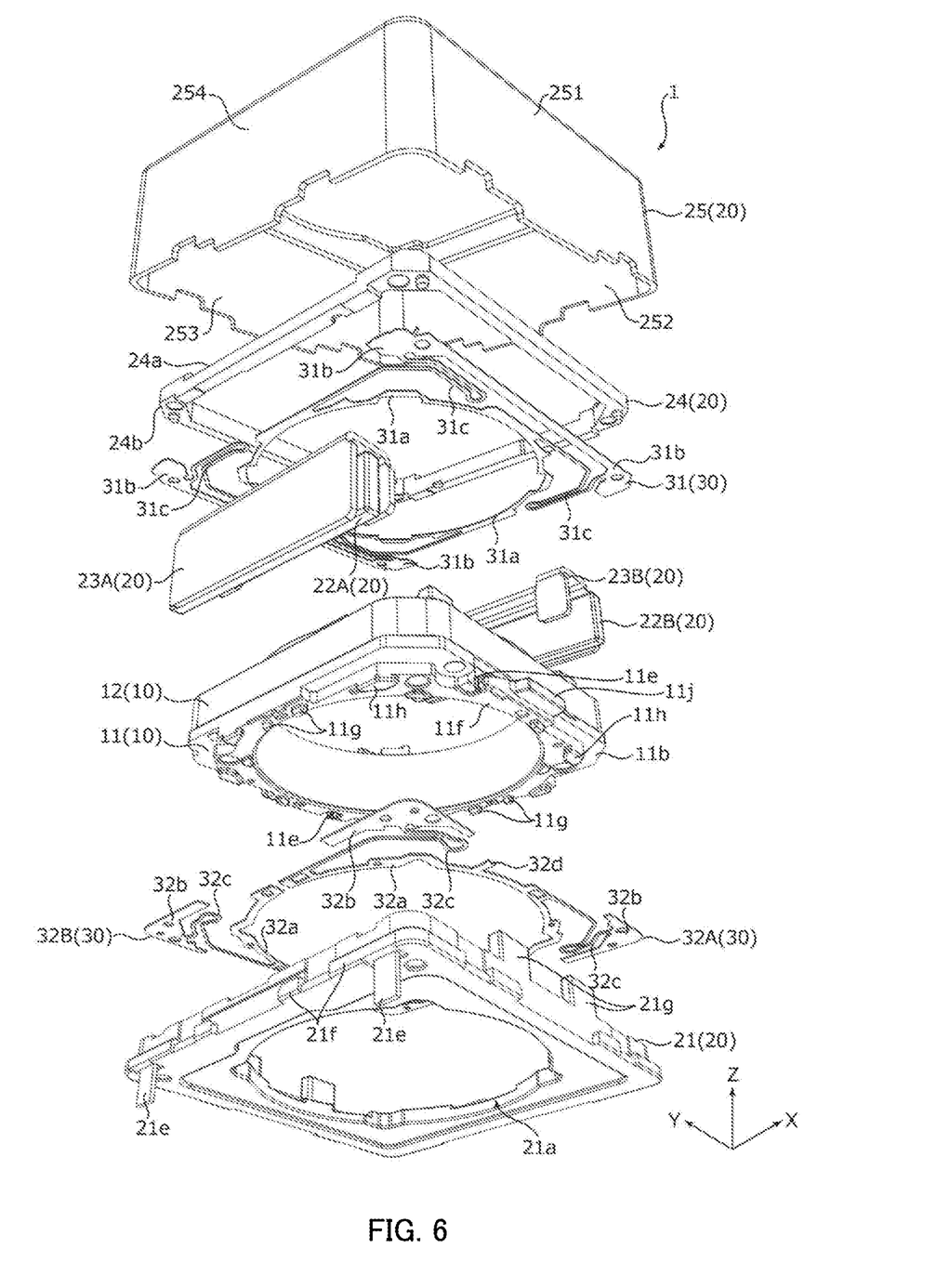
FIG. 6 is an exploded perspective view of the lens driving apparatus as seen from below.

FIG. 3 is a perspective view illustrating a state where case 25 is removed from lens driving apparatus 1. FIG. 4 is a plan view illustrating a state where case 25, spacer 24, and upper elastic supporting member 31 are removed from lens driving apparatus 1. FIGS. 5 and 6 are an exploded perspective view of lens driving apparatus 1. FIG. 5 is the upper exploded perspective view seen from the light reception side in the optical-axis direction, and FIG. 6 is the lower exploded perspective view seen from the image formation side in the optical-axis direction. As illustrated in FIGS. 3 to 6, lens driving apparatus 1 includes AF movable part 10, AF fixing part 20, elastic supporting member 30, and the like. AF movable part 10 is disposed to be radially inwardly spaced apart from AF fixing part 20, and is coupled with AF fixing part 20 by elastic supporting member 30.

AF movable part 10 includes an AF coil being a component of the AF voice coil motor, and moves in the optical-axis direction during focusing. AF fixing part 20 includes AF magnets being a component of the AF voice coil motor. That is, the moving-coil system is employed in lens driving apparatus 1.

In the embodiment, AF movable part 10 is composed of lens holder 11 and AF coil 12. AF fixing part 20 is composed of base 21, AF magnets 22A and 22B, yokes 23A and 23B, spacer 24, and case 25. Upper elastic supporting member 31 and lower elastic supporting members 32A and 32B constitute elastic supporting member 30.

Lens holder 11 is a member that is generally square in plan view, and includes lens housing 11a that is cylindrical, and flange portion 11b that projects radially outward from lens housing 11a.

Lens housing 11a entirely has an octagonal shape in plan view, with its outer peripheral surface being formed into a rough shape. Lens part 2 (see FIG. 2) is fixed to the inner peripheral surface of lens housing 11a by adhesion or screwing. AF coil 12 is disposed at the outer periphery of lens housing 11a.

Lens housing 11a includes, at the peripheral edge thereof, upper-spring fixing portion 11c to which upper elastic supporting member 31 is fixed. Positioning pieces 11d protruding on the light reception side in the optical-axis direction are disposed to upper-spring fixing portion 11c. Upper elastic supporting member 31 is positioned by positioning pieces 11d. Positioning pieces 11d are roughened so that an adhesive for adhering upper elastic supporting member 31 stays thereon.

Regulation pieces 11i protruding toward the light reception side in the optical-axis direction are disposed at the peripheral edge of lens housing 11a. When AF movable part 10 moves on the light reception side in the optical-axis direction, regulation pieces 11i come into contact with case 25, thereby regulating further movement.

Flange portion 11b has a shape corresponding to AF coil 12, that is, a generally octagonal shape in plan view. Flange portion 11b has cutouts 11e (hereinafter referred to as coil pull-out portions 11e) as a relief part for pulling out the ends of AF coil 12 toward the base 21 side (image formation side in the optical-axis direction).

Flange portion 11b includes, on its lower surface, lower-spring fixing portion 11f to which lower elastic supporting members 32A and 32B are fixed. Positioning pieces 11g protruding on the image formation side in the optical-axis direction are disposed to lower-spring fixing portion 11f. Lower elastic supporting members 32A and 32B are positioned by positioning pieces 11g.

Regulation pieces 11h protruding toward the image formation side in the optical-axis direction are disposed on the lower surface of flange portion 11b. When AF movable part 10 moves on the image formation side in the optical-axis direction, regulation pieces 11h come into contact with base 21, thereby regulating further movement. Flange portion 11b includes, at two sides extending along the Y-direction, engagement pieces 11j protruding radially outward.

AF coil 12 is an air-core coil to be energized at the time of focusing. AF coil 12 is wound in an octagonal shape in plan view along the outer periphery of lens housing 11a. Since the outer peripheral surface of lens housing 11a is roughened, lens housing 11a and AF coil 12 partially come into contact with each other at four portions of the plane, fixed with an adhesive, and partially spaced apart from each other (see FIG. 4).

The ends of AF coil 12 are pulled out via coil pull-out portions 11e of lens holder 11 toward the base side, and are electrically connected to tying parts 32d of lower elastic supporting members 32A and 32B.

AF coil 12 is preferably formed from a copper clad aluminum wire that is an aluminum wire covered with copper. This makes it possible to achieve weight reduction in comparison with the case where AF coil 12 is formed using a copper wire.

Base 21 is a square member in plan view, and includes circular opening 21a at the center of base 21. Base 21 includes depressed portions 21b having a shape corresponding to the lower portion of lens holder 11. In camera module A, the image capturing part (not illustrated) is disposed on the image formation side of base 21 in the optical-axis direction.

Base 21 includes, at its four corners, lower-spring fixing portions 21c to which lower elastic supporting members 32A and 32B are fixed. Positioning boss 21d protruding toward lens holder 11 (on the light reception side in the optical-axis direction) is disposed to each lower-spring fixing portion 21c. Lower elastic supporting members 32A and 32B are positioned by positioning bosses 21d.

Terminal metal fixtures 21e are disposed to two lower-spring fixing portions 21c, for example, by insert molding. One ends (portions exposed on the light reception side in the optical-axis direction) of terminal metal fixtures 21e are electrically connected to lower elastic supporting members 32A and 32B. The other ends (portions protruding on the image formation side in the optical-axis direction) of terminal metal fixtures 21e are electrically connected to an auto-focus driver terminal (not illustrated) mounted in an image sensor board (not illustrated).

Base 21 includes, at its peripheral surface, case attaching pieces 21f on which case 25 is placed. Case 25 is positioned by case attaching pieces 21f. Case 25 is fixed, for example, adhesively to case attaching pieces 21f while being placed on case attaching pieces 21f.

Base 21 includes two rising pieces 21g each at two sides extending along the Y-direction. Engagement pieces 11j of lens holder 11 are each fitted between rising pieces 21g and 21g (see FIGS. 3 and 4). With this configuration, base 21 and lens holder 11 are engaged with each other to regulate rotation of AF movable part 10 in the XY plane.

AF magnets 22A and 22B are each composed of a flat plate magnet and are disposed to face in the Y-direction. AF magnets 22A and 22B are disposed to side surfaces 254 and 252 of case 25 via yokes 23A and 23B.

AF magnets 22A and 22B are arranged radially outside AF coil 12. AF magnets 22A and 22B are magnetized such that magnetic fields radially crossing AF coil 12 are formed at AF coil 12. For example, AF magnets 22A and 22B are magnetized to an N pole on the inner periphery sides thereof and to an S pole on the outer periphery sides thereof. AF magnets 22A and 22B and AF coil 12 constitute the AF voice coil motor.

Yokes 23A and 23B hold AF magnets 22A and 22B, respectively and are configured to form magnetic circuits with AF magnets 22A and 22B. Yokes 23A and 23B are interposed between case 25 and AF magnets 22A and 22B, respectively. Yokes 23A and 23B are formed, for example, by drawing of a plate material made of a magnetic material (e.g., cold rolled steel plate (SPCC)).

Yoke 23A and 23B each include flat plate-shaped yoke body portion 23a disposed to case 25; opposite yoke portion 23c that sandwiches AF coil 12 and faces both ends of yoke body portion 23a; and coupling portion 23b that couples yoke body portion 23a to opposite yoke portion 23c. Both ends of yoke body portion 23a, coupling portion 23b, and opposite yoke portion 23c extend in a U-shaped manner.

Figure 9:
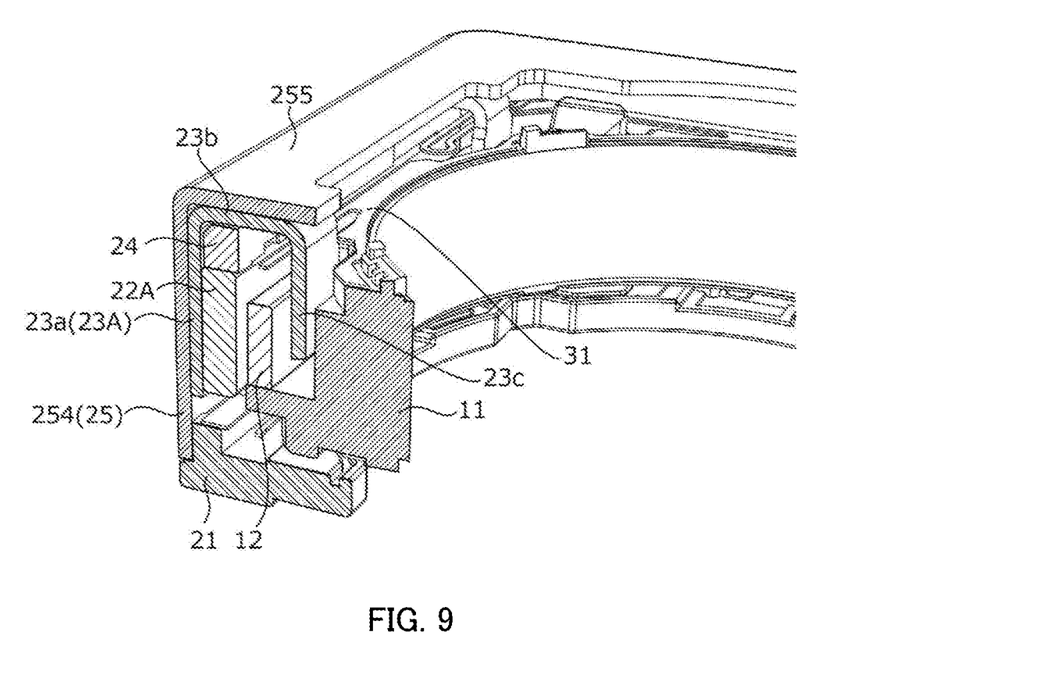
FIG. 9 is a sectional view illustrating a positional relationship between a lens holder, an AF coil, a base, an AF magnet, the yoke, the spacer, and the case.

Opposite yoke portion 23c is inserted into a space between lens housing 11a and AF coil 12 (see FIGS. 3, 4, and 9). With this configuration, opposite yoke portion 23c and lens holder 11 are engaged with each other to regulate rotation and movement of AF movable part 10 in the XY plane. The engagement portion of opposite yoke portion 23c and lens holder 11 and the engagement portion of base 21 and lens holder 11 establish a 90-degree rotated positional relationship. This regulates the rotation and movement of AF movable part 10 in the XY plane.

In the neutral state where AF coil 12 is not energized, opposite yoke portion 23c is spaced apart from flange portion 11b of lens holder 11 (see FIG. 9). When AF coil is energized and, accordingly, lens holder 11 moves, for example, on the light reception side in the optical-axis direction, opposite yoke portion 23c approaches flange portion 11b, but does not come into contact therewith.

Magnetic circuits are formed by yokes 23A and 23B and AF magnets 22A and 22B, so that the driving efficiency improves. Since separation-type yokes 23A and 23B are provided corresponding to AF magnets 22A and 22B, respectively, the influence of magnetic interference on the surroundings becomes smaller in comparison with the case where a box-type yoke which covers the entire lens driving apparatus is conventionally provided.

AF magnets 22A and 22B are preferably disposed to be spaced apart from coupling portions 23b of yokes 23A and 23B. In the embodiment, spacer 24 is disposed in gaps between AF magnets 22A and 22B and coupling portions 23b. With this configuration, leakage fluxes from AF magnets 22A and 22B toward coupling portions 23b of yokes 23A and 23B are reduced and a magnetic flux crossing AF coil 12 increases, so that the driving efficiency of the voice coil motor improves.

The longitudinal length of yoke body portions 23a of yokes 23A and 23B is preferably smaller than those of AF magnets 22A and 22B. This, in turn, protrudes AF magnets 22A and 22B beyond both ends of yoke body portion 23a in the longitudinal direction. With this configuration, leakage fluxes outward from AF magnets 22A and 22B are reduced and a magnetic flux crossing AF coil 12 increases, so that the driving efficiency of the voice coil motor further improves.

Spacer 24 is a square frame in plan view. Spacer 24 is formed of a non-magnetic material (e.g., polyarylate (PAR)). Spacer 24 includes, at two sides extending along the X-direction, depressed portions 24a for holding yokes 23A and 23B. Coupling portions 23b of yokes 23A and 23B are fitted in depressed portions 24a (see FIGS. 3 and 4). Spacer 24 also includes, on its lower surface, upper-spring fixing portions 24*b* to which upper elastic supporting member 31 is fixed.

Case 25 is a square casing in plan view, having four side surfaces 251 to 254 and top panel 255. Case 25 is formed of a non-magnetic material, preferably a non-magnetic metal material. As the non-magnetic metal material, an austenitic stainless steel SUS316 or NSSC_130S (trade name, "NSSC" is a registered trademark), nickel silver, and the like are applicable. Case 25 may be formed of a resin material having high mechanical strength such as polycarbonate or the like.

Figure 7:
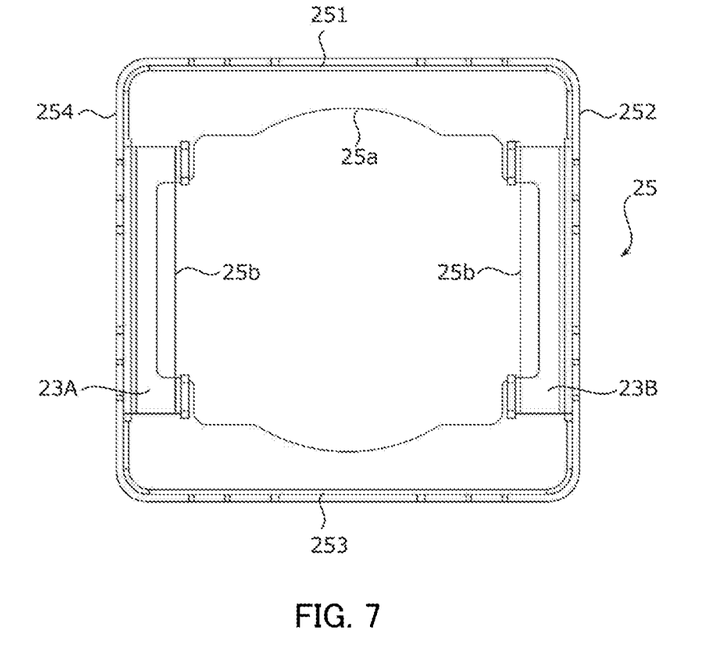
FIG. 7 is a plan view illustrating a state of attaching a yoke to the case.
Figure 8:
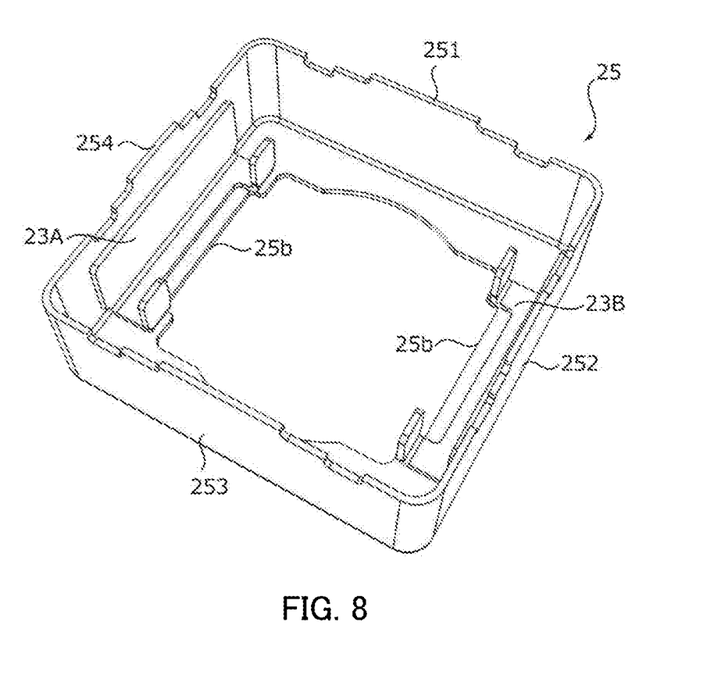
FIG. 8 is a perspective view illustrating the state of attaching the yoke to the case.

Case 25 includes, at its top panel 255, opening 25*a* from which lens part 2 (see FIG. 2) faces outside. Cutouts 25*b* are formed at opening 25*a* so as to extend along the X-direction. The shape of cutouts 25*b* corresponds to that of yokes 23A and 23B. As illustrated in FIGS. 7 and 8, opposite yoke portions 23*c* of yokes 23A and 23B are aligned with step portions of cutouts 25*b* of case 25, thereby making it possible to easily position yokes 23A and 23B with respect to case 25.

In the embodiment, AF magnets 22A and 22B are arranged on two side surfaces 254 and 252 facing in the Y-direction of case 25 via yokes 23A and 23B. Meanwhile, no AF magnet is arranged on two side surfaces 251 and 253 facing in the X-direction of case 25. That is, side surfaces 251 and 253 are magnet non-arranged surfaces (hereinafter referred to as "magnet non-arranged surfaces 251 and 253"). As described above, by providing magnet non-arranged surfaces 251 and 253 to which AF magnets 22A and 22B are not disposed, the magnetic flux densities on the magnet non-arranged surface side are decreased. Therefore, another camera module is disposed adjacent to magnet non-arranged surface 251 or 253 of case 25, thereby making it possible to significantly reduce the influence of magnetic interference.

In this case, distance L (see FIG. 4) from longitudinal ends of AF magnets 22A and 22B to the outer surfaces of magnet non-arranged surfaces 251 and 253 is preferably 1.2 mm or more and 1.6 mm or less. This makes it possible to reduce the influence of magnetic interference on the camera module that is disposed adjacent to the voice coil motor, while the driving force of the voice coil motor is ensured.

Upper elastic supporting member 31 is a plate spring made of beryllium copper, nickel copper, titanium copper, stainless steel, or the like, for example (upper elastic supporting member 31 may hereinafter be referred to as "upper spring 31"). Upper spring 31 elastically supports AF movable part 10 (lens holder 11) with respect to AF fixing part 20 (spacer 24).

Upper spring 31 is shaped by using a method such as etching one sheet metal, for example. Upper spring 31 includes lens-holder holding portions 31*a*, spacer fixing portions 31*b*, and arm portions 31*c*. Spacer fixing portions 31*b* adjacent in the Y-direction are coupled by outer edges 31*d*.

Upper spring 31 has a shape not interfering (overlapping) with AF magnets 22A and 22B and yokes 23A and 23B. Lens-holder holding portions 31*a* have a shape conforming to upper-spring fixing portions 11*c* of lens holder 11, and have cutouts at portions corresponding to positioning pieces 11*d*. Arm portions 31*c* connect lens-holder holding portions 31*a* to spacer fixing portions 31*b*. Arm portions 31*c* have a zigzag shape, and elastically deform when AF movable part 10 moves.

Upper spring 31 is positioned to lens holder 11 and fixed thereto by engagement of cutouts (whose reference numeral is omitted) of lens-holder holding portions 31*a* with positioning pieces 11*d* of lens holder 11. Moreover, upper spring 31 is fixed to spacer 24 by adhesion of spacer fixing portions 31*b* to upper-spring fixing portions 24*b* of spacer 24. When AF movable part 10 moves in the optical-axis direction, lens-holder holding portions 31*a* are displaced along with AF movable part 10.

Lower elastic supporting members 32A and 32B are a plate spring made of beryllium copper, nickel copper, titanium copper, stainless steel, or the like, for example (lower elastic supporting members 32A and 32B may hereinafter be referred to as "lower springs 32A and 32B"). Lower springs 32A and 32B elastically support AF movable part 10 (lens holder 11) with respect to AF fixing part 20 (base 21).

Lower springs 32A and 32B are shaped by using a method such as etching one sheet metal, for example. Lower springs 32A and 32B each include lens-holder holding portions 32*a*, base fixing portions 32*b*, and arm portions 32*c*. Lens-holder holding portions 32*a* have a shape corresponding to lower-spring fixing portion 11*f* of lens holder 11. Arm portions 32*c* connect lens-holder holding portions 32*a* to base fixing portions 32*b*. Arm portions 32*c* have a zigzag shape, and elastically deform when AF movable part 10 moves.

Lower springs 32A and 32B each include tying part 32*d* in lens-holder holding portions 32*a*. The end of AF coil 12 pulled out from coil pull-out portions 11*e* of lens holder 11 is wound around tying part 32*d*. Base fixing portions 32*b* are electrically connected to terminal metal fixtures 21*e* disposed to base 21. Therefore, electricity is supplied to AF coil 12 via lower springs 32A and 32B.

Lower springs 32A and 32B are positioned to lens holder 11 and fixed thereto by fitting and inserting positioning pieces 11*g* of lens holder 11 into fixing holes (whose reference numeral is omitted) of lens-holder holding portions 32*a*. Moreover, lower springs 32A and 32B are positioned to base 21 and fixed thereto by fitting and inserting positioning bosses 21*d* of base 21 into fixing holes (whose reference numeral is omitted) of base fixing portions 32*b*. When AF movable part 10 moves in the optical-axis direction, lens-holder holding portions 32*a* are displaced along with AF movable part 10.

FIG. 9 is a sectional view illustrating a positional relationship between lens holder 11, AF coil 12, base 21, AF magnet 22A, yoke 23A, spacer 24, and case 25. As illustrated in FIG. 9, yoke 23A comes into L-shaped contact with side surface 254 and top panel 255 of case 25 and is adhered thereto. Yoke 23A is adhered by welding or with epoxy resin, for example.

Spacer 24 with upper spring 31 attached thereto is adhered to coupling portion 23*b* of yoke 23A. Then, AF magnet 22A is adhered to yoke body portion 23*a* so as to sandwich spacer 24 between AF magnet 22A and yoke 23A (coupling portion 23*b*). The position of AF magnet 22A in the Z-direction is determined depending on the thickness of spacer 24.

When AF movable part 10 is attached to AF fixing part 20, opposite yoke portion 23*c* of yoke 23A is inserted between lens holder 11 and AF coil 12. Since AF coil 12 is positioned between AF magnet 22A and opposite yoke portion 23*c*, the magnetic fluxes in the magnetic circuit formed by AF magnet 22A and opposite yoke portion 23*c* efficiently cross AF coil 12. Therefore, the voice coil motor can obtain a desired driving force.

When automatic focusing is performed in lens driving apparatus 1, AF coil 12 is energized. When AF coil 12 is energized, a Lorentz force is generated at AF coil 12 by interaction between the magnetic fields of AF magnets 22A and 22B and the current flowing through AF coil 12. The direction of the Lorentz force is the direction (Z-direction) orthogonal to the directions of the magnetic fields generated by AF magnets 22A and 22B and to the direction of the current flowing through AF coil 12. Since AF magnets 22A and 22B are fixed, a reactive force acts on AF coil 12. With this reactive force serving as the driving force of the AF voice coil motor, AF movable part 10 including AF coil 12 moves in the optical-axis direction, so that focusing is performed.

In a non-energization state where automatic focusing is not performed, AF movable part 10 is held suspended between an infinity position and a macro position, for example, by upper elastic supporting member 31 and lower elastic supporting members 32A and 32B (this state may hereinafter be referred to as "reference state"). That is, AF movable part 10 is elastically supported to be displaceable on both sides in the Z-direction while being positioned with respect to AF fixing part 20 by upper elastic supporting member 31 and lower elastic supporting members 32A and 32B. When focusing is performed, the directions of currents are controlled depending on whether AF movable part 10 is to be moved toward the macro position side or toward the infinity position side from the reference state. In addition, the magnitude of currents is controlled depending on the moving distance (stroke) of AF movable part 10 from the reference state.

With this configuration, lens driving apparatus 1 includes AF coil 12 disposed at the periphery of lens holder 11, and AF magnets 22A and 22B disposed to be radially spaced apart from AF coil 12, and moves, with respect to AF fixing part 20 including AF magnets 22A and 22B, AF movable part 10 including AF coil 12 in the optical-axis direction by utilizing the driving force of the voice coil motor composed of AF coil 12 and AF magnets 22A and 22B. AF fixing part 20 includes case 25 having a quadrangular shape in plan view made of a non-magnetic material (e.g., austenitic stainless steel), and base 21 to which case 25 is fixed; and AF magnets 22A and 22B have a flat plate shape disposed to side surfaces 254 and 252 of case 25. At least one of four side surfaces 251 to 254 of case 25 (side surfaces 251 and 253 in this embodiment) is a magnet non-arranged surface to which AF magnets 22A and 22B are not disposed.

According to lens driving apparatus 1, since two side surfaces 251 and 253 of case 25 are magnet non-arranged surfaces, the magnetic flux densities on the magnet non-arranged surface side decreases. Therefore, the influence of magnetic interference occurring when another lens driving apparatus is disposed adjacent to magnet non-arranged surfaces 251 or 253 of case 25 is significantly reduced. In addition, another lens driving apparatus is not necessarily disposed to be spaced apart from lens driving apparatus 1, and can be disposed close thereto, so that it is possible to achieve miniaturization of lens driving apparatus 1. Therefore, lens driving apparatus 1 is suitable for use as a dual camera while making it possible to suppress magnetic interference with an adjacent lens driving apparatus.

While the invention made by the present inventor has been specifically described based on the preferred embodiment, it is not intended to limit the present invention to the above-mentioned preferred embodiment, but the present invention may be further modified within the scope and spirit of the invention defined by the appended claims.

For example, although the embodiment has been described by mentioning a smartphone as an example of a camera-mounted device having camera module A, the present invention is applicable to a camera-mounted device serving as an information apparatus or a transport apparatus.

The camera-mounted device serving as an information device is an information device including a camera module and a control section that processes image information obtained with the camera module, and examples of such a camera-mounted device include a camera-equipped mobile phone, a note-type personal computer, a tablet terminal, a mobile game machine, a web camera, and a camera-equipped in-vehicle apparatus (e.g., a rear-view monitor apparatus or a drive recorder apparatus). In addition, the camera-mounted device serving as a transporting device is a transporting device including a camera module and a control part that processes an image obtained with the camera module, and examples of such a camera-mounted device include an automobile.

Figure 10A:
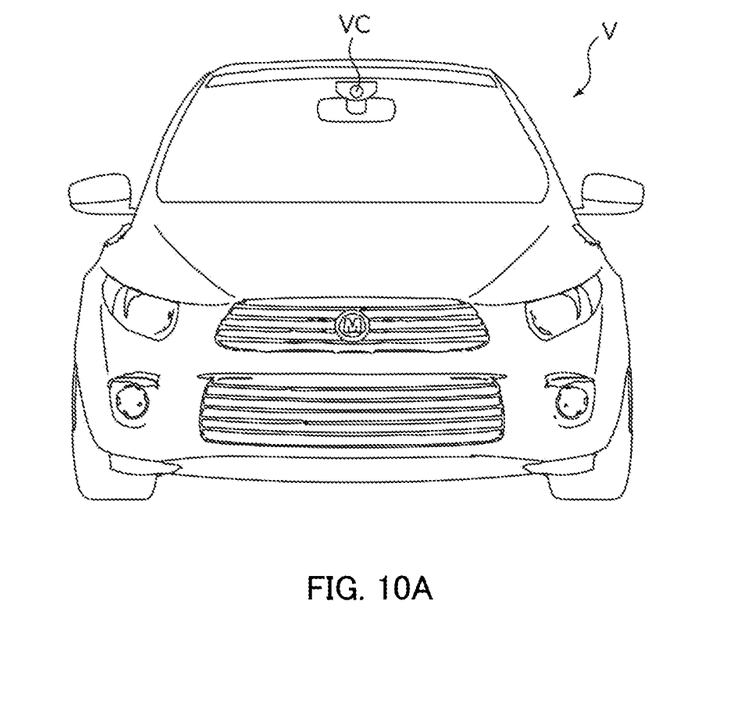
FIGS. 10A and 10B illustrate an automobile as a camera-mounted apparatus in which an in-vehicle camera module is mounted.
Figure 10B:
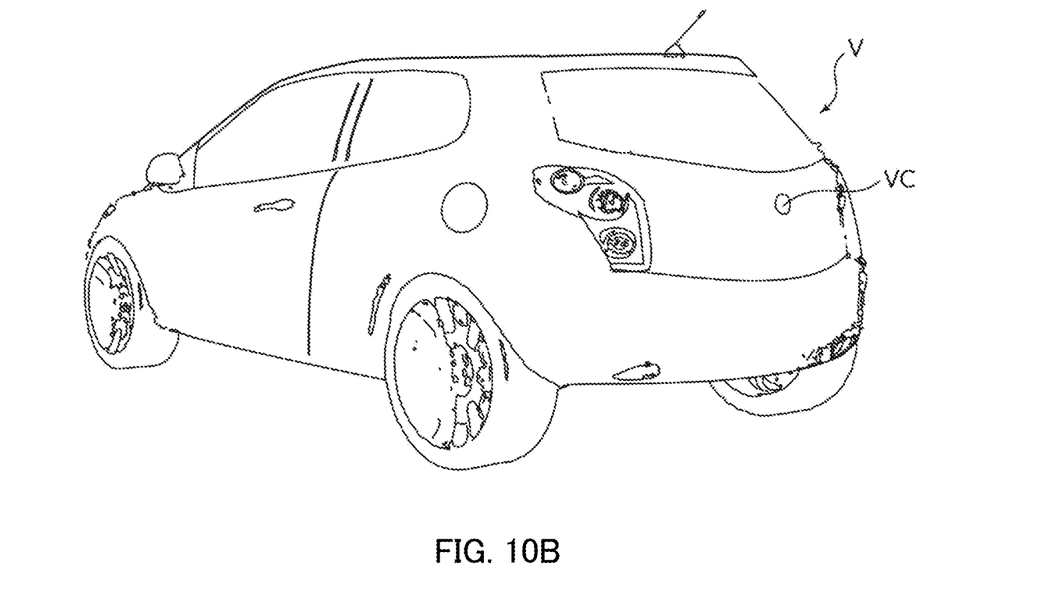

FIGS. 10A and 10B illustrate automobile V as the camera-mounted apparatus in which camera module VC (Vehicle Camera) is mounted. FIG. 10A is a front view of automobile V and FIG. 10B is a rear perspective view of automobile V. In automobile V, camera module A described in the embodiment is mounted as in-vehicle camera module VC. As illustrated in FIGS. 10A and 10B, in-vehicle camera module VC may, for example, be attached to the windshield so as to face forward, or to the rear gate so as to face backward. Onboard camera module VC is used for rear monitoring, drive recording, collision avoidance control, automatic drive control, and the like.

Moreover, for example, in the embodiment, among four side surfaces 251 to 254 of case 25, two side surfaces 251 and 253 facing in the X-direction are a magnet non-arranged surface, but one side surface or three side surfaces may be a magnet non-arranged surface. Note, however, that in consideration of the balance of lens drive, it is preferable that AF magnets 22A and 22B are disposed to two side surfaces 254 and 252 facing each other among four side surfaces 251 to 254 of case 25 and the remaining two side surfaces 251 and 253 are magnet non-arranged surfaces, as in the embodiment.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

REFERENCE SIGNS LIST

1 Lens driving apparatus
2 Lens part
10 AF movable part (Autofocus movable part)
11 Lens holder
12 AF coil (Auto-focusing coil)
20 AF fixing part (Autofocus fixing part)
21 Base
22A, 22B AF magnet (Auto-focusing magnet)
23A, 23B Yoke
24 Spacer
25 Case
251, 253 Side surface (magnet non-arranged surface)
252, 254 Side surface
255 Top panel
30 Elastic supporting member
31 Upper elastic supporting member
32A, 32B Lower elastic supporting member
M Smart phone (Camera-mounted apparatus)
A Camera module

The invention claimed is:

1. A lens driving apparatus, comprising:
   an auto-focusing coil to be disposed at a periphery of a lens holder; and
   an auto-focusing magnet to be disposed to be radially spaced apart from the auto-focusing coil, the lens driving apparatus being configured to move, with respect to an autofocus fixing part including the auto-focusing magnet, an autofocus movable part including the auto-focusing coil in an optical-axis direction by utilizing a driving force of a voice coil motor composed of the auto-focusing coil and the auto-focusing magnet,
   wherein the autofocus fixing part comprises a case having a quadrangular shape in plan view made of a non-magnetic material; and a base to which the case is fixed,
   wherein the auto-focusing magnet has a flat plate shape disposed to side surfaces of the case, and
   wherein at least one of four side surfaces of the case is a magnet non-arranged surface to which the auto-focusing magnet is not disposed; and
   wherein the autofocus fixing part comprises a yoke made of a magnetic material, the yoke being interposed between the case and the auto-focusing magnet and the yoke being configured to form a magnetic circuit with the auto-focusing magnet, wherein the yoke comprises:
   a flat plate-shaped yoke body portion disposed to the case;
   an opposite yoke portion that sandwiches the auto-focusing coil and faces both ends of the yoke body portion; and
   a coupling portion that couples the yoke body portion to the opposite yoke portion, and the both ends of the yoke body portion, the coupling portion, and the opposite yoke portion extend in a U-shaped manner.

2. The lens driving apparatus according to claim 1, wherein
   the auto-focusing magnet is disposed to two side surfaces facing each other among four side surfaces of the case.

3. The lens driving apparatus according to claim 1, wherein
   a distance from a longitudinal end of the auto-focusing magnet to an outer surface of the magnet non-arranged surface is 1.2 mm or more and 1.6 mm or less.

4. The lens driving apparatus according to claim 1, wherein
   the case is made of a non-magnetic metal material.

5. The lens driving apparatus according to claim 1, wherein the auto-focusing magnet is disposed to be spaced apart from the coupling portion in the optical-axis direction.

6. The lens driving apparatus according to claim 1, wherein the autofocus fixing part comprises a spacer to be interposed between the auto-focusing magnet and the coupling portion.

7. The lens driving apparatus according to claim 1, wherein a longitudinal length of the yoke body portion is smaller than a longitudinal length of the auto-focusing magnet.

8. The lens driving apparatus according to claim 1, wherein the case comprises, at its top panel, an opening from which the lens part faces outside, and at a part of the opening, a cutout having a shape corresponding to a shape of the yoke.

9. The lens driving apparatus according to claim 1, wherein the opposite yoke portion and the lens holder are engaged with each other to regulate rotation and movement of the autofocus movable part in an optical-axis-orthogonal plane.

10. The lens driving apparatus according to claim 9, wherein
    the base and the lens holder are engaged with each other to regulate rotation and movement of the autofocus movable part in the optical-axis-orthogonal plane.

11. The lens driving apparatus according to claim 10, wherein
    the engagement portion of the opposite yoke portion with the lens holder and the engagement portion of the base with the lens holder establish a 90-degree rotated positional relationship.

12. A camera module, comprising:
    a lens driving apparatus according to claim 1;
    a lens part to be mounted in the lens driving apparatus; and
    an image capturing part configured to capture a subject image imaged by the lens part.

13. A camera-mounted apparatus being an information device or a transporting device, the camera-mounted apparatus comprising:
    the camera module according to claim 12.

14. The camera-mounted apparatus according to claim 13, comprising:
    the camera module; and
    another camera module to be disposed adjacent on the magnet non-arranged surface side of the camera module.

* * * * *